Jan. 3, 1928.  R. M. ROWELL  1,655,244

TELEMETRIC SUMMATION SYSTEM

Filed May 7, 1925  2 Sheets-Sheet 1

Inventor
Ralph M. Rowell
by *His Attorney*

Jan. 3, 1928.

R. M. ROWELL 1,655,244

TELEMETRIC SUMMATION SYSTEM

Filed May 7, 1925    2 Sheets-Sheet 2

Inventor
Ralph M. Rowell
by *Alexander S. Smith*
His Attorney

Patented Jan. 3, 1928.

1,655,244

UNITED STATES PATENT OFFICE.

RALPH M. ROWELL, OF LYNN, MASSACHUSETTS, ASSIGNOR TO GENERAL ELECTRIC COMPANY, A CORPORATION OF NEW YORK.

TELEMETRIC SUMMATION SYSTEM.

Application filed May 7, 1925. Serial No. 28,751.

My invention relates to a system for summing up or averaging the readings of two or more indicating devices and giving an indication of such summation or average at any desired point.

In large electric power systems it ofttimes becomes desirable to obtain an indication of the total power delivered by two or more generator units or stations at a load control point or points which may be some distance from the point or points at which the individual loads are metered. In any such system a certain amount of flexibility is desirable to meet changing conditions such as the addition of generating units, or the change in location of the control station. My invention relates to a telemetric summation system of general application having the desirable features of simplicity, accuracy and reliability.

In carrying my invention into effect, I make use of electrical position transmitting and receiving apparatus. The summation of the various transmitted indications takes place in the receiving apparatus by the simple expedient of connecting the movable elements of two or more receivers together so as to give an indication which is the resultant of the individual transmitted indications under all transmitting conditions within the range of the apparatus. This resultant indicating instrument is calibrated to indicate the sum of the individual transmitted indications.

Figure 1:
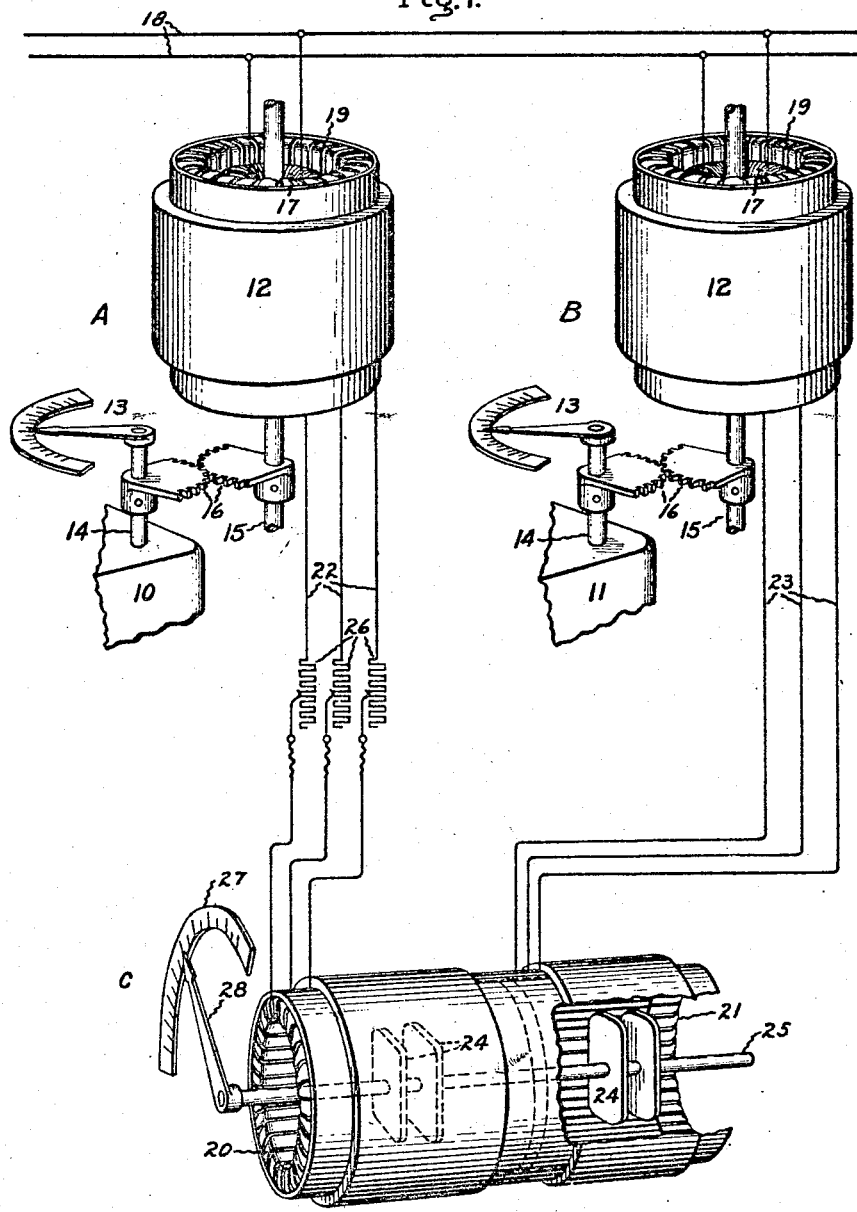
Figure 2:
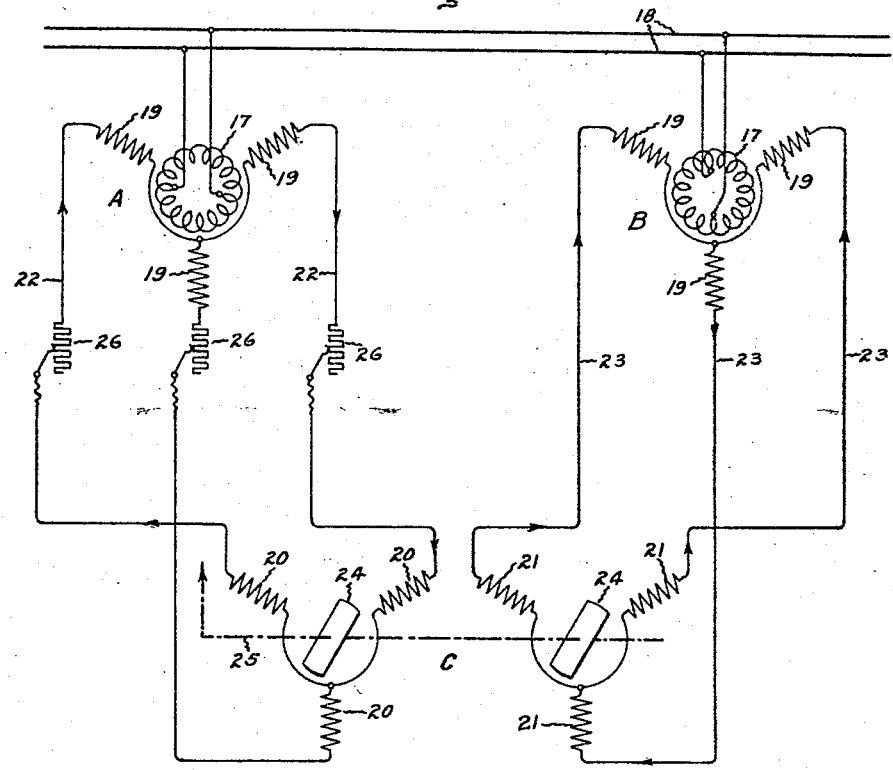

The features of my invention which are believed to be novel and patentable will be pointed out in the claims appended hereto. For a better understanding of my invention, reference is made in the following description to the accompanying drawing wherein Fig. 1 represents one arrangement of the mechanical details of my invention; Fig. 2 a wiring diagram for the apparatus of Fig. 1, and Fig. 3 a further modification of the invention.

Referring to Fig. 1, 10 and 11 represent two indicating devices which, for the purpose of illustration, will be assumed to be indicating wattmeters measuring independent loads at stations A and B, respectively. Let us further assume that it is desired to obtain a continuous summation indication of the readings of these two meters at a station C. To bring out certain advantages of the system which is to be described, let us assume that stations A and B are, say, a mile apart and station C is much nearer to A than to B.

At stations A and B there are similar electrical position transmitters 12 having their movable elements 17 suitably arranged to be moved in response to the indications of instruments 10 and 11, respectively. In the illustration, the shafts 14 of the instruments are mechanically connected to the rotatable shafts 15 of the transmitters by gear sectors 16. Any other suitable arrangement may be used. Each transmitter illustrated consists of a single phase primary rotatable element 17, connected to a common source of alternating current supply 18 and a stationary three phase connected secondary element 19. These electrical connections are more clearly indicated in Fig. 2.

The combined receiving and summation apparatus at station C consists of two primary stator elements 20 and 21, each connected three phase to the corresponding secondary transmitting element at stations A and B by three circuit lines 22 and 23. These two stator elements 20 and 21 are placed end to end in alignment and are provided with secondary elements 24 mounted on a common rotatable indicating shaft 25. The secondary elements are in this case a pair of light iron vanes which tend to align themselves with the major flux axis of the stator elements.

While I have represented certain parts of the system as being connected 3 phase, it will be appreciated that the current in this part of the circuit is not a three phase current but is essentially a divided single phase current since the primary source is single phase.

The principle of telemetric transmission here illustrated may be explained more fully as follows. In Fig. 2 let us assume a position of the rotatable primary 17 at station A, such as to produce a field having a horizontal line of magnetization. This will not produce any current in the lower star connected coils of the corresponding secondary stator element 19 or the primary receiving element 20, but will produce a single phase current in the other two star connected coils by transformer action as indicated by arrows in Fig. 2, and consequently, a horizontal line of magnetization in the corresponding secondary of the receiving element.

Similarly assume a position of the primary transmitter element at station B such as to produce an axis of magnetization having a vertical axis. This will produce a single phase current in the star connected circuit all flowing through the lower star connected coils of the transmitter and receiver but dividing equally in the other two sets of coils producing a flux in the stator 21 having a vertical axis. This condition of affairs will tend to rotate the secondary 24 of receiving element 20 to a horizontal position and the secondary element of receiving element 21 to a vertical position. Since the two secondary elements are both mounted on the same shaft, they will take a compromise or resultant position of 45° to the vertical if the two torques are equal. I have discovered that the displaced position of the armature members of the receiving apparatus has a negligible effect upon the transmitting units. It will readily be seen that for any other combination of conditions the shaft of the receiving element will take a compromise position which is the average of the two positions of the rotors at the sending stations. The same thing would be true for a delta connection instead of a star connection in the three phase connected circuit. There are numerous electrical telemetric systems in which this principle may be utilized; consequently, I do not wish to limit my invention to the particular telemetric system hereinbefore described. It is, however, desirable to select a system which requires as few interconnected wires as possible, consistent with accuracy and one in which the torques of the various elements of the receiving apparatus may be properly proportioned.

It was assumed that station B was located a greater distance from station C than from A, consequently the line drops to station C would not ordinarily be the same. This difference in line drop, as well as any other inequalities in the torque producing functions of the two separate systems operating on the receiver may be adjusted and made equal by adjustable reactance devices in the shorter of the two systems. Such adjusting means is represented at 26.

The principle hereinbefore described of averaging the positions of the transmitters to obtain a resultant indicating position at the transmitter for the purpose of summing up the readings of the indicating instruments at stations A and B is utilized as follows:

To take a simple example, let us assume that the instruments 10 and 11 each have indicating scales of equal arc length and that full scale deflection corresponds to 100 units. If the gear ratios at 16 are each 1:1, the arc length of the scale 27 of the receiving apparatus will be the same as that of the two instruments 10 and 11, but will be graduated to read 200 units full scale deflection. Now, for any indicating combination of the two instruments 10 and 11, the deflection of the pointer 28 on scale 27 will be a resultant of such indications, but since the scale 27 reads twice as much as a corresponding deflection on either of instruments 10 and 11 the indicated result will be the sum of such indications. Thus if instrument 10 reads 0 and instrument 11 reads 100 pointer 28 will give a resultant half scale deflection at 27 but will indicate 100 or the sum of the meter indications. The arc length of scale 27 need not be necessarily the same as that of instruments 10 and 11. For instance with 90° scales on the instruments 10 and 11 and a 2 to 1 gear ratio at 16 the scale at 27 becomes a 180° scale. Furthermore, it is not essential that the arc length of the scales of instruments 10 and 11 be the same because the difference may be taken care of by the gear ratios at 16.

Figure 3:
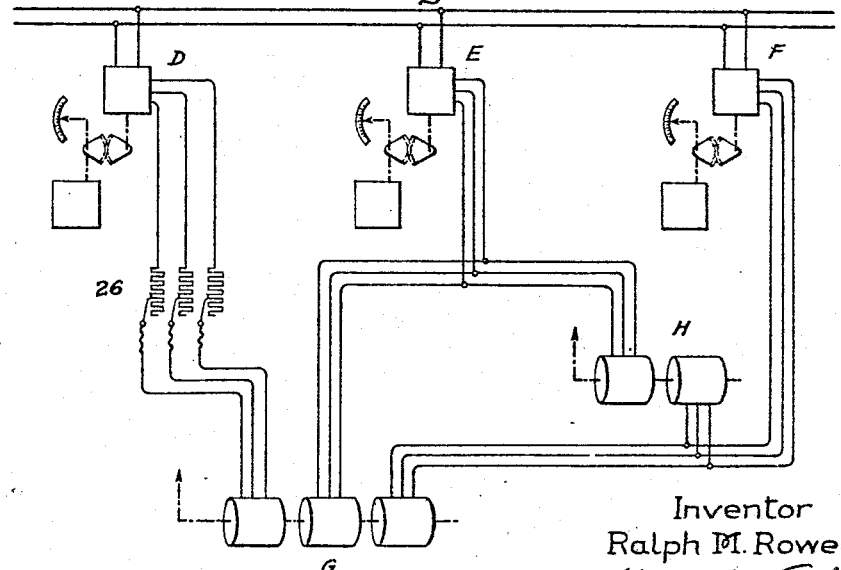

The same general principle hereinbefore discussed applies for the summation of more than two indications and in Fig. 3 I have indicated a system for transmitting the readings of individual instruments located at three points "D", "E" and "F" to a point G where the readings are summed up by a three element receiving apparatus operating on a common indicator. In this case if the full scale deflection of the instruments at stations D", E" and F" correspond to 100 units the full scale deflection of the receiving apparatus at G will correspond to 300 units.

In this figure I have also represented a two unit summation apparatus at a point H for summing up the readings of stations E and F, the transmitters at these stations feeding two different receiving instruments located at different points.

If the transmitters at stations D, E and F are of equal capacity and the individual receiving elements at stations H and G are of equal capacity a reactance 26 should be placed in the transmitting circuit between stations D and G to absorb a load equal to that of one of the receiving instruments, thus giving the three receiving elements at station G equal torques.

In accordance with the provisions of the patent statutes I have described the principle of operation of my invention together with the apparatus which I now consider to represent the best embodiment thereof, but I desire to have it understood that the apparatus shown is only illustrative and that the invention may be carried out by other means and for other purposes.

What I claim as new and desire to secure by Letters Patent of the United States, is:—

1. In a system for telemetrically obtaining the sum of a plurality of indications comprising a plurality of transmitting devices each having rotor and stator elements, one of which elements is provided with a single phase alternating current winding and the other of which is provided with a polyphase winding, a single phase source of alternating current for energizing the single phase windings of all of said devices, a receiver having a plurality of polyphase stator windings to which the polyphase windings of the indicators are respectively connected, a magnetic vane rotor for each stator element of the receiver, said rotor elements being mounted on a common shaft, means for positioning the rotor elements of the various transmitters in accordance with the indications to be summed, and means operated by the shaft of the receiver for indicating the sum of such indications.

2. In a system for telemetrically obtaining the sum of a plurality of indications comprising a plurality of electric transmitters each having a single phase rotor element and a polyphase winding stator element, a single phase source of supply for energizing all of said rotor elements, a receiver having a plurality of polyphase wound stators respectively connected to the polyphase windings of the various transmitters, a magnetic vane rotor for each stator element of the receiver, measuring instruments for positioning the rotor elements of the various transmitters in accordance with the indications to be summed, and means jointly influenced by the magnetic vane rotors of the receiver for indicating the sum of such indications.

In witness whereof, I have hereunto set my hand this 5th day of May, 1925.

RALPH M. ROWELL.